United States Patent Office 2,905,604
Patented Sept. 22, 1959

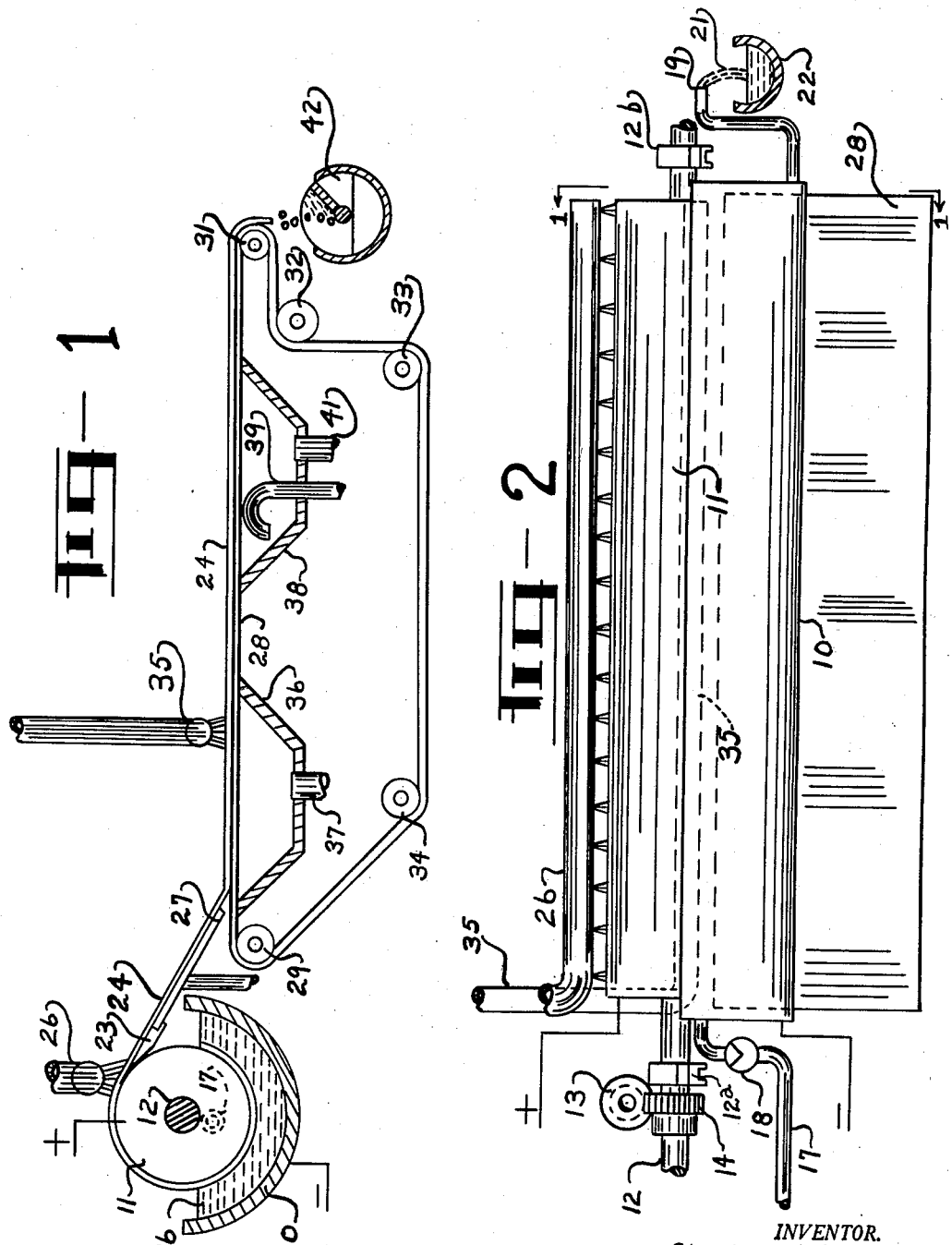

2,905,604

PROCESS AND APPARATUS FOR ELECTROLYTI-
CALLY TREATING BLACK LIQUOR

Absalom M. Kennedy and John M. Jernigan,
Tuscaloosa, Ala.

Application January 5, 1956, Serial No. 557,531

10 Claims. (Cl. 204—56)

This invention relates to the treatment of black liquor obtained in the production of cellulose pulp and has for an object a method whereby lignin or a lignin-like material is recovered from the spent black liquor from a paper mill in a simple and economical manner.

Another object is the simultaneous recovery of lignin and an enriched alkaline solvent which may be re-employed for the separation of lignin from the cellulose of the raw material.

A further object is the recovery of the alkaline content from alkaline black liquor in such form that it may be directly used for the production of additional cellulose pulp.

A still further object is an electrical process for the recovery of lignin from alkaline black liquor in a manner such that no chemical or reagent is expended.

Still another object of our invention is the provision of a cyclic process for the treatment of black liquid which shall produce no undesirable chemical by-product requiring waste disposal.

An additional object is a method for treating black liquor whereby objectionable odors are not discharged into the atmosphere.

The raw materials, such as wood chips, straw, bagasse, etc., from which cellulose pulp is produced consist principally of cellulose fibers cemented or bound together by lignin. Other organic substances as sugars, and with coniferous wood oils and resins, may also be present in smaller amounts.

The object of pulping is to free the fibers from the lignin and other substances which bind the fibers together. In the alkaline processes, to which this invention particulary relates, this is accomplished by forming a soluble alkaline salt, such as a sodium-salt of the lignin with a solution, such as sodium hydroxide, as in the "soda" process, or with a solution containing principally sodium hydroxide and sodium sulphides, as in the "sulphate" process. It is equally applicable to other known alkali processes.

After digestion of the raw materials, usually wood chips, with the alkali liquor under pressure and at an elevated temperature, the resulting solution, known from its color as "black liquor," is separated from the fibers which are washed and further treated for the production of paper, box board, and other cellulose products. The soap skimmings, or so called "floating soap" consisting principally of sodium salts of acids and resins in the wood are then removed, leaving a black liquor substantially free of oily and resinous matter. The separation and recovery of the lignin and a lignin free alkali solution adapted for reuse in the digesters forms the basis of this patent application.

As is well known in the art to which our invention relates, a very important factor in the economic balance for the sulphate process has been the recovery of the spent liquor from the cooking process. The black liquor removed from the pulp in the pulp washer or diffuser contains 95 to 98% of the total alkali charged to the digester. Most of the alkali is present as sodium salts of the wood acids and of lignin. Total inorganic solids usually average about 5% to 10% of the black liquor. This black liquor has heretofore been first concentrated in multiple effect or cascade evaporators to a concentration between 45% and 80% total solids, depending on the type of recovery unit. This removal of water is necessary in order to produce a liquor that will ignite and burn when sprayed into a furnace. The thus concentrated liquor is then burned and the resulting ash is leached to recover the alkali for reuse in the process.

It is accordingly the prime object of our invention to provide a process whereby both the alkali and the lignin may be recovered, whereby the alkali may be reused in the pulping process and the lignin employed in useful ways such as forming an important component of various plastic compositions.

Apparatus adapted for carrying out our improved process is illustrated diagrammatically in the accompanying drawing in which:

Fig. 1 represents a cross section of an electrolytic cell together with apparatus whereby the recovered lignin may be continuously washed, dried, and otherwise put in condition for commercial use or distribution; and, Fig. 2 is a longitudinal view, partly in section, of the electrolytic cell showing details of the revolving anode drive and control of the incoming black liquor and the recovered alkaline liquor.

Referring to the drawings, we show a tank or container 10 of an electrolytic cell made of suitable metal which, by way of example, may be iron, sheet steel, stainless steel or other metal, and which is connected to the negative pole of a direct current source, thereby functioning as the cathode of the electrolytic cell. A means for varying the current passing through the cell, such as a rheostat, not shown, may be provided, as is well understood.

The anode of the cell, connected to the positive pole of a direct current source, is shown at 11 and is mounted for rotation on a shaft 12 carried by bearings 12a and 12b, and turned by suitable means, such as a worm 13 and gear 14 indicated in Fig. 2. The anode rotates in an electrolyte 16 of alkaline black liquor from which the oily or resinous matter, such as the soap skimmings from coniferous wood chips, has been removed.

The black liquor is supplied through a pipe 17 controlled by a valve 18, and enters preferably at the upper part of the cell. The resulting alkali enriched liquor, produced at the cathode 10 flows to the opposite end and is discharged through a tube or pipe 19, preferably connected to the lower part of the cell but so arranged that the effluent 21 is at a higher elevation so as to maintain a constant level of the electrolyte 16 within the cell, as shown. A trough or conduit 22 is provided to convey this effluent to storage or to be used in the digestion of a fresh batch of wood chips.

In operation, alkaline black liquor, from the "soda" or "sulphate" process of pulping, after removal of the soap skimmings, is continuously introduced through the pipe 17 into the electrolytic cell, forming the electrolyte 16 thereof, the rate of flow of the black liquor being regulated by the valve 18 and that of the electric current through the cell is so adjusted that the effluent 21 (Fig. 2) will have the required degree of causticity to be introduced into the pulping digesters for use on a fresh batch of wood chips. Anode current densities of 5 to 60 amperes per square foot have been used.

It is evident that the rates of flow of the black liquor and of the current through the cell will have have a direct relation, each to the other, and that the cell may be continuously operated at various output rates up to the maximum which is limited by the heating of the electrolyte. Also, the apparatus may be so regulated as to separate all the negatively charged organic materials in the liquor. The rate of rotation of the anode 11 is adjusted so that a thin film of lignin may be readily removed by a scraper 23 and turbulence in the electrolyte 16 avoided.

When current is passed through the electrolyte, ligneous material is deposited on the anode 11 which rotates clockwise as shown by the arrow in Fig. 1 and is removed therefrom by the scraper 23 in a thin layer as indicated at 24. We have found that at a high current density at the anode or with the electrolyte at an elevated temperature, the film 24 may be too hard to be readily scraped from the anode, accordingly a tube 26 is arranged for spraying a regulated amount of water on the ligneous film to dilute and soften it.

The film 24 is discharged from the scraper 23 onto a slide 27 and thence onto a moving belt 28 of porous fabric, carried by pulleys 29, 31, 32, 33 and 34, as shown, one of which such as 29 acts as a drive to maintain the belt at a speed to provide a film of ligneous material of convenient thickness for the subsequent washing and other operations to produce a finished product.

The ligneous film 24, as deposited on the anode and discharged on the belt 28, contains some of the alkaline black liquor 16 by absorption. On leaving the scraper 23, the film receives a spray of water provided through a pipe 35, which passes through the film and the belt 28 into a tank 36 and is removed through a pipe 37. To facilitate the more rapid movement of the wash water through the belt 28, a partial vacuum may be produced within the tank 36, by any suitable means, not shown.

To remove excess water from the ligneous film 24, it is moved by the belt 28 over a second tank 38 in which a sub-atmospheric pressure is maintained through a pipe 39 connected to a vacuum pump, not shown. Any water which accumulates within the tank 38 may be removed through a pipe 41.

After passing over the tank 38, the lignin, now partially dried and having but slight adhesion to the belt, is carried over the pulley 31 which is of comparatively small diameter, the flexing of the belt serving to strip the ligneous film therefrom and to discharge it into a conveyor 42, which may be of the belt or worm type, by which it is transported to a dryer, not shown, operated at an elevated temperature and in which most of the water is removed and the lignin is brought into a substantially dry state. The flakey dried material may then be pulverized to reduce it to a very fine or impalpable powder which is characteristic of lignin.

The amount of water admitted through the pipe 26 and the suction maintained on the tank 36 are adjusted so that after passing over the tank 36 the lignin is substantially free from adhering black liquor and after passing over the tank 38, excess water has been removed and the film 24 may be freely separated from the belt 28 by flexing over the pulley 31.

While the above mentioned apparatus has been described as a means for continuously obtaining lignin and a solution of increased alkalinity for reuse in digesting cellulose producing raw material, it is obvious that other apparatus may also be used for the purpose.

We wish it to be understood that we do not desire to be limited to the exact details of apparatus and procedure herein described as obvious modifications will occur to a person skilled in the art.

What we claim is:

1. A process for treating substantially oil and resin free alkaline black liquor obtained from the production of cellulose pulp which comprises introducing said oil and resin free alkaline black liquor continuously into an undivided electrolytic cell whereby said liquor is in direct contact with the cathode of the cell and forms the sole electrolyte for the cell, passing a direct current of electricity through said cell whereby the lignin content of the black liquor is deposited continuously on the anode of the cell and concentrated alkaline liquor is produced continuously adjacent the cathode of the cell, removing the deposited lignin continuously from said anode, and removing continuously a portion of the concentrated alkaline liquor from said cell.

2. A process for treating substantially oil and resin free alkaline black liquor obtained from the production of cellulose pulp which comprises introducing said oil and resin free alkaline black liquor continuously into an undivided electrolytic cell whereby said liquor is in direct contact with the cathode of the cell and forms the sole electrolyte for the cell, passing a direct current of electricity through said cell whereby the lignin content of the black liquor is deposited continuously on the anode of the cell and concentrated alkaline liquor is produced continuously adjacent the cathode of the cell, removing the lignin thus deposited continuously from said anode, and removing continuously a portion of concentrated alkaline liquor from said cell at a rate to maintain a substantially constant level of the electrolyte in said cell.

3. A process for treating a resin and oil free solution of a soluble sodium salt of lignin which comprises introducing said solution continuously into an undivided electrolytic cell whereby said solution is in direct contact with the cathode of the cell and forms the sole electrolyte for the cell, passing a direct current of electricity through said cell whereby the lignin content of said solution is deposited continuously on the anode of the cell and concentrated alkaline electrolyte is produced continuously adjacent the cathode of the cell, removing the lignin thus deposited continuously from said anode, and removing continuously a portion of the concentrated alkaline electrolyte from said cell.

4. A process for treating a resin and oil free solution of a soluble alkali metal salt of lignin which comprises introducing said solution continuously into an undivided electrolytic cell whereby said solution is in direct contact with the cathode of the cell and forms the sole electrolyte for the cell, passing a direct current of electricity through said cell at an anode current density of from 5 to 60 amperes per square foot whereby the lignin content of said salt is deposited continuously on the anode of the cell and concentrated alkaline electrolyte is produced continuously adjacent the cathode of the cell, removing the lignin thus deposited continuously from said anode, and removing continuously a portion of the concentrated alkaline electrolyte from said cell.

5. In a process for treating a resin and oil free solution of a soluble alkali metal salt of lignin, the steps which comprise introducing said solution continuously into an undivided electrolytic cell whereby said solution is in direct contact with the cathode of the cell and forms the sole electrolyte for the cell, passing a direct current of electricity through said cell whereby the lignin content of said solution is deposited continuously on the anode of the cell and concentrated alkaline electrolyte is produced continuously adjacent the cathode of the cell, removing continuously a portion of the concentrated alkaline electrolyte from said cell, removing the deposited lignin continuously from said anode, washing the lignin thus removed to free the same of said electrolyte, and drying the lignin thus washed.

6. An apparatus for recovering the lignin and alkaline content of a resin and oil free soluble alkali salt of lignin, an undivided receptacle for receiving a solution of said salt and defining a cathode for an electrolytic cell with the solution as the sole electrolyte and in direct contact with said cathode, an anode within said receptacle in contact with the electrolyte, an inlet passageway adjacent one side of said receptacle for introducing said solution continuously into said receptacle, means passing a direct current of electricity through said cell whereby the lignin is deposited continuously on the anode and concentrated alkaline solution is produced continuously adjacent said cathode, means removing said lignin continuously from said anode, and a discharge passageway adjacent the opposite side of said receptacle from said inlet passageway for removing the concentrated alkaline solution adjacent the lower portion of said cell.

7. Apparatus as defined in claim 6 in which the anode is in the form of a drum mounted for rotation with the lower portion thereof in contact with the electrolyte and the means for removing the lignin from the anode comprises a scraper member in contact with a portion of said drum outwardly of said electrolyte.

8. Apparatus as defined in claim 7 in which spray means is mounted adjacent the drum in position to discharge water onto the lignin prior to removal thereof whereby the lignin is softened.

9. In apparatus for removing the lignin and alkaline content of a resin and oil free soluble alkali metal salt of lignin, an undivided receptacle for receiving a solution of said salt and defining a cathode for an electrolytic cell with the solution as the sole electrolyte and in direct contact with said cathode, an anode within said receptacle in contact with the electrolyte, an inlet passageway means for introducing said solution continuously into said receptacle, means passing a direct current of electricity through said cell whereby the lignin is deposited continuously on the anode and concentrated alkaline solution is produced adjacent said cathode, a discharge passageway adjacent the opposite side of said receptacle from said inlet passageway for removing the concentrated alkaline solution adjacent the lower portion of said cell, means removing said lignin continuously from said anode, means for washing the lignin removed from the anode, and means for drying the lignin.

10. A process for treating substantially oil and resin free alkaline black liquor obtained from the production of cellulose pulp which comprises introducing said oil and resin free alkaline black liquor into an undivided electrolytic cell whereby said liquor is in direct contact with the cathode of the cell and is the sole electrolyte for the cell, passing a direct current of electricity through said cell whereby the lignin content of the black liquor is deposited continuously on the anode of the cell and concentrated alkaline liquor is produced continuously adjacent the cathode of the cell, removing the deposited lignin continuously from said anode, and removing the concentrated alkaline liquor from the lower portion of said cell.

References Cited in the file of this patent

UNITED STATES PATENTS

| | | |
|---|---|---|
| 942,207 | Kitsee | Dec. 7, 1909 |
| 1,062,016 | Langlet | May 20, 1913 |
| 1,435,886 | Acton et al. | Nov. 14, 1922 |
| 1,750,177 | Klein | Mar. 11, 1930 |
| 1,770,789 | La Corsa | July 15, 1930 |
| 2,743,220 | Estes | Apr. 24, 1956 |